(12) United States Patent
Yoon et al.

(10) Patent No.: US 7,660,860 B2
(45) Date of Patent: Feb. 9, 2010

(54) METHOD FOR DISCOVERY REPLY PACKET TRANSMISSION IN COMMUNICATION NETWORK

(75) Inventors: Hyung-min Yoon, Suwon-si (KR);
Tack-don Han, Suwon-si (KR);
Beom-seok Kang, Suwon-si (KR);
Kyung-ho Park, Suwon-si (KR);
Woo-shik Kang, Suwon-si (KR)

(73) Assignee: Samsung Electro-Mechanics Co., Ltd, Suwon-si (KR)

( * ) Notice: Subject to any disclaimer, the term of this patent is extended or adjusted under 35 U.S.C. 154(b) by 428 days.

(21) Appl. No.: 11/271,877

(22) Filed: Nov. 14, 2005

(65) Prior Publication Data

US 2006/0106753 A1    May 18, 2006

(30) Foreign Application Priority Data

Nov. 17, 2004    (KR) ............... 10-2004-0093906

(51) Int. Cl.
*G06F 15/16* (2006.01)
*H04B 7/212* (2006.01)
*H04L 12/54* (2006.01)
*H04Q 7/00* (2006.01)

(52) U.S. Cl. .................. 709/206; 709/200; 709/230; 709/250; 370/443; 370/329; 370/418

(58) Field of Classification Search ........... 709/200, 709/230, 250, 206; 370/443, 329, 418
See application file for complete search history.

(56) References Cited

U.S. PATENT DOCUMENTS 5,586,054 A * 12/1996 Jensen et al. ............. 324/533

(Continued)

FOREIGN PATENT DOCUMENTS

CN       1287432 A       3/2001

(Continued)

OTHER PUBLICATIONS

Coleri S et. al.: "Power Efficient System for Sensor Networks" Computers and Communication, 2003. (ISCC 2003). Processings. Eighth IEEE International Symposium on Jun. 30-Jul. 3, 203 Piscatway, NJ, USA, IEEE, 2003 pp. 837-842, XP0106.*

(Continued)

*Primary Examiner*—Ario Etienne
*Assistant Examiner*—Sahera Halim
(74) *Attorney, Agent, or Firm*—Sughrue Mion, PLLC

(57) ABSTRACT

A method for determining a transmission time of collected context information at a sensor node in a communication system that includes a client, at least one sensor node collecting context information, and an access point (AP) forwarding the context information received from the sensor node to the client. The communication system operates in a session layer of protocol layers of open systems interconnection (OSI). The sensor node calculates a transmission period in which the collected context information is transmitted, and randomly determines a transmission time at which the context information is transmitted within the calculated transmission period. Since the collected context information is transmitted at the transmission time randomly determined by the sensor node, the load on the AP can be balanced.

20 Claims, 5 Drawing Sheets

U.S. PATENT DOCUMENTS

| | | |
|---|---|---|
| 6,608,821 B1 * | 8/2003 | Gendel ........................ 370/280 |
| 6,680,950 B1 * | 1/2004 | Nagata et al. ................ 370/461 |
| 7,313,105 B1 * | 12/2007 | Lo et al. ...................... 370/320 |
| 2001/0002196 A1 * | 5/2001 | Fellman et al. .............. 370/442 |
| 2002/0017988 A1 * | 2/2002 | Irwin ........................... 340/539 |
| 2003/0174757 A1 * | 9/2003 | Partyka ........................ 375/132 |
| 2007/0064721 A1 * | 3/2007 | Garcia-Luna-Aceves .... 370/445 |
| 2008/0130687 A1 * | 6/2008 | Ha et al. ...................... 370/498 |

FOREIGN PATENT DOCUMENTS

| | | |
|---|---|---|
| WO | WO 99/59293 A1 | 11/1999 |
| WO | WO9959293 * | 11/1999 |
| WO | 03/034641 A1 | 4/2003 |

OTHER PUBLICATIONS

Coleri S et al., "Power efficient system for sensor networks", Computers and Communication, 2003, (ISCC 2003) Proceedings Eighth IEEE International Symposium on Jun. 30-Jul. 3, 2003, Piscataway, NJ, USA, IEEE, 2003, pp. 837-842, XP010646119.

Shinji Mothgi, et al. "Implementation and Evaluation Of On-demand Address Allocation for Event-Driven Sensor Network" ITE Technical Report Apr. 23, 2004, pp. 1-6, vol. 28 No. 24, Tokyo, Japan.

* cited by examiner

METHOD FOR DISCOVERY REPLY PACKET TRANSMISSION IN COMMUNICATION NETWORK

CROSS-REFERENCE TO RELATED APPLICATIONS

This application claims the benefit under 35 U.S.C. § 119 (a) from Korean Patent Application No. 2004-93906 filed on Nov. 17, 2004 in the Korean Intellectual Property Office, the entire disclosure of which is incorporated herein by reference.

BACKGROUND OF THE INVENTION

1. Field of the Invention

The present invention relates generally to a communication system including a plurality of sensor nodes. More specifically, the present invention relates to a method for seamlessly transmitting information collected at sensor nodes to a client.

2. Description of the Related Art

Recently, the computing environment has been advancing toward a ubiquitous computing environment with the rapid prevalence of Internet and mobile networks and the convergence of wireless networks. The advent of new nodes and services has brought a trend toward compactness and intelligence. Especially, intelligent services are provided in association with context information of users.

The context information collected by the nodes is present in the service environment and provides information for efficient services, including behavior, location, direction, and environment conditions of the user. To deliver the intelligent service suitable for the environment of the user based on the context information, it is required to aggregate, store, classify, translate, and combine the context information. In addition, standardization is demanded for predictable context information so as to take advantage of various types of context information.

Given the widespread prevalence of the mobile computing environment, nodes need to rapidly adapt to the ever-changing environment. In other words, the services in such an environment require the discovery of a device (node) to provide the context information and to obtain the context information. In this regard, architectures that support service discovery protocols such as Jini, Service Location Protocol (SLP), and Salutation are available.

FIG. 1 illustrates a communication network constructed with a plurality of sensor nodes. The communication network includes an access point (AP) 102 and a client 100. The client 100 discovers sensor nodes that provide the context information and request the context information from the sensor nodes. The sensor nodes are randomly located within a sensor field 110. The sensor nodes collect the context information according to the request from the client 100. When the client 100 requests at least two context information, the sensor nodes transfer the two context information as requested. The AP 102 relays messages (packets) between the client 100 and the sensor nodes.

FIG. 2 illustrates how to transmit and receive the context information according to the request of a client in a communication network including a plurality of sensor nodes, which will be explained below.

Referring to FIG. 2, the communication network includes a client, an AP, and a sensor node 1 through a sensor node N. It should be understood that the communication network may include other components besides those mentioned above. Note that FIG. 2 illustrates only requisite components to facilitate the understanding of the present invention.

The client transmits a discovery request packet to the AP to obtain context information requested from a user (S200). The discovery request packet contains the context information requested from the user and information relating to an address of the client. Even when the user requests at least two context information, the client can transfer only one discovery request packet to request the context information.

Upon receiving the discovery request packet, the AP forwards the discovery request packet to neighbor sensor nodes (S202). The AP duplicates the received discovery request packet and consecutively forwards the duplicate packets to the neighbor sensor nodes. Typically, the AP forwards the duplicate packets to the sensor nodes within a short time period. It is noted that the AP can multicast the received discovery request packet to the neighbor sensor nodes without packet duplication.

The sensor nodes, upon receiving the discovery request packet, collect the context information requested by the user. If the user requests at least two context information, the sensor nodes collect the at least two context information respectively.

After collecting the context information, the sensor nodes transmit a discovery reply packet to the AP (S204). Although FIG. 2 depicts that the sensor node 1 through the sensor node N send the discovery reply packet to the AP at the same time, the sensor node 1 through the sensor node N collect the requested context information, generate the discovery reply packet containing the collected context information, and then transmit the generated discovery reply packet to the AP. Accordingly, the sensor node 1 through the sensor node N may transmit the discovery reply packet to the AP with a time difference.

The sensor node 1 through the sensor node N receive the discovery request packet from the AP and collect the context information substantially at the same time. Thus, the sensor node 1 through the sensor node N transmit the discovery reply packet to the AP substantially at the same time.

The AP forwards the discovery reply packet received from the sensor node 1 through the sensor node N, to the client (S206). When the discovery reply packets are received from the sensor node 1 through the sensor node N at the same time, the AP is not able to process all the received packets. Thus, the AP temporarily stores some of the packets in queue. The packets in part are temporarily stored in the queue since the AP cannot forward all of the received packets to the client. The packets beyond the storage capacity of the queue are lost or dropped. The greater the number of sensor nodes in the communication network, the greater the number of discovery reply packets received at the AP. Therefore, the packet drop ratio increases.

The client, which does not receive some of the discovery reply packets, retransmits the discovery request packet to the AP for more accurate context aggregation. Upon receiving the discovery request packet retransmitted from the AP, the sensor nodes retransmit the collected context information. As a result, the total discovery time and the network traffic increase in proportion to the number of the retransmissions.

SUMMARY OF THE INVENTION

The present invention has been provided to solve the above-mentioned and other problems and disadvantages occurring in the conventional arrangement, and an aspect of the present invention provides a method for reducing a drop ratio of a discovery reply packet, which is transmitted from a sensor nodes, at an access point (AP) in a network including a plurality of sensor nodes.

Another aspect of the present invention provides a method for rapidly receiving context information at a user by decreasing a packet drop ratio at an AP.

To achieve the above aspects and/features of the present invention, a method for determining a transmission time of collected context information at a sensor node in a communication system that includes a client, at least one sensor node collecting context information, and an access point (AP) forwarding the context information received from the sensor node to the client, the communication system operating in a session layer of protocol layers of open systems interconnection (OSI), includes calculating a transmission period in which the collected context information is transmitted; and randomly determining a transmission time at which the context information is transmitted within the calculated transmission period.

In accordance with another aspect of the present invention, a method for determining a transmission time of collected context information at a sensor node in a communication system that includes a client, at least one sensor node collecting context information, and an access point (AP) forwarding the context information received from the sensor node to the client, the communication system operating in a session layer of protocol layers of open systems interconnection (OSI), includes calculating a transmission period in which the collected context information is transmitted; fragmenting a packet of the collected context information by a specific size; and randomly determining transmission times at which the fragmented context information are transmitted within the calculated transmission period.

In accordance with still another aspect of the present invention, a method for determining a transmission time of collected context information at a sensor node in a communication system that includes a client, at least one sensor node collecting context information, and an access point (AP) forwarding the context information received from the sensor node to the client, the communication system operating in a session layer of protocol layers of open systems interconnection (OSI), includes calculating a transmission period in which the collected context information is transmitted; fragmenting a packet of the collected context information by unit of at least one context information; and randomly determining transmission times at which the fragmented context information are transmitted within the calculated transmission period.

In accordance with yet another aspect of the present invention, a method for determining a transmission time of collected context information at a sensor node in a communication system that includes a client, at least one sensor node collecting context information, and an access point (AP) forwarding the context information received from the sensor node to the client, the communication system operating in a session layer of protocol layers of open systems interconnection (OSI), includes selecting a transmission type of context information based on at least one of a number of sensor nodes and a status of a radio channel; calculating a transmission period in which the collected context information is transmitted; randomly determining a transmission time at which the context information is transmitted within the calculated transmission period; and transmitting the context information at the determined transmission time according to the selected transmission type.

BRIEF DESCRIPTION OF THE DRAWING FIGURES

These and/or other aspects and advantages of the invention will become apparent and more readily appreciated from the following description of exemplary embodiments, taken in conjunction with the accompanying drawing figures of which:

DETAILED DESCRIPTION OF EXEMPLARY EMBODIMENTS

Figure 1:
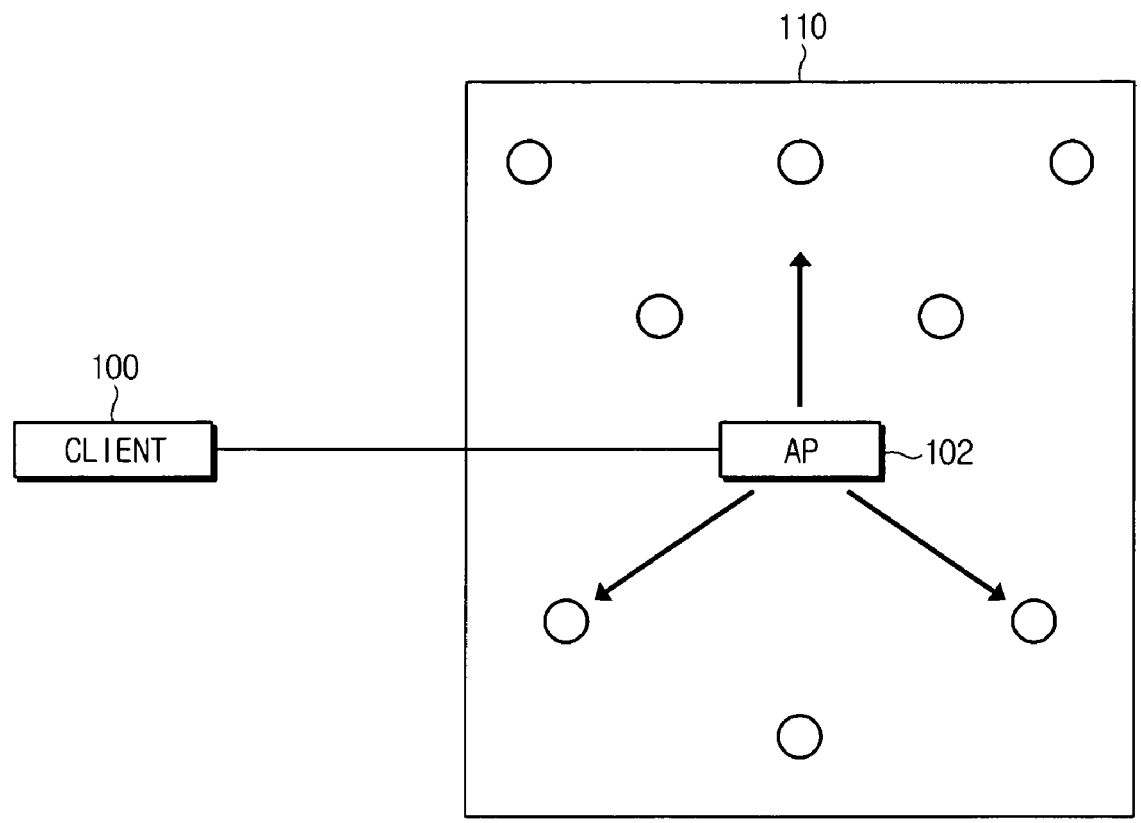
FIG. 1 illustrates a communication network including a plurality of sensor nodes.

Certain exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since that would obscure the invention in unnecessary detail.

Figure 3:
FIG. 3 illustrates a format of a discovery reply packet.

FIG. 3 depicts a format of a discovery reply packet according to an embodiment of the present invention. In FIG. 3, the discovery reply packet includes a header field and a plurality of context information fields. The number of the context information fields is variable depending on the number of context information provided from a node.

The header field contains an address of a node that transmits its collected context information, and an address of a destination of the discovery reply packet. The context information field contains context information requested by a user, specifically, the context information field contains an identifier of the context information requested by the user, context information, and a connection port. Exemplary embodiments of the present invention will be explained in order.

First Exemplary Embodiment

Figure 2:
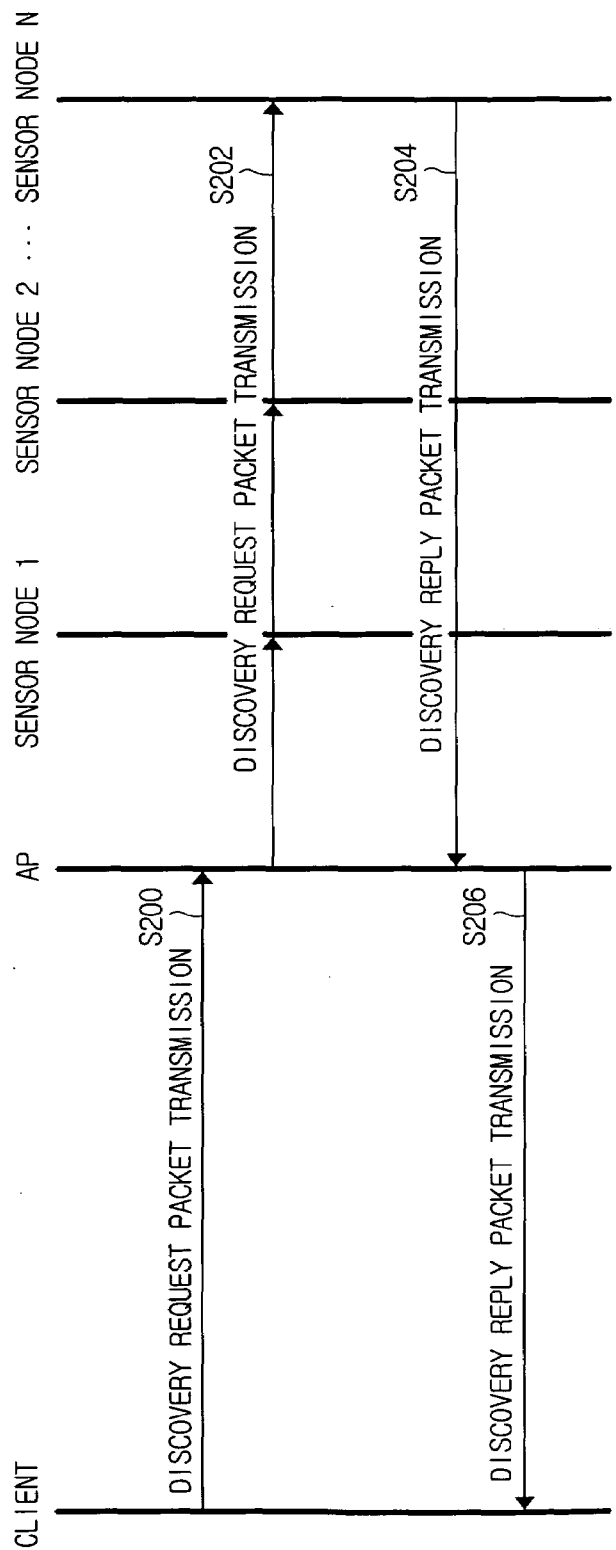
FIG. 2 illustrates transmission and reception of a discovery request packet and a discovery reply packet between a conventional client and sensor nodes.
Figure 4:
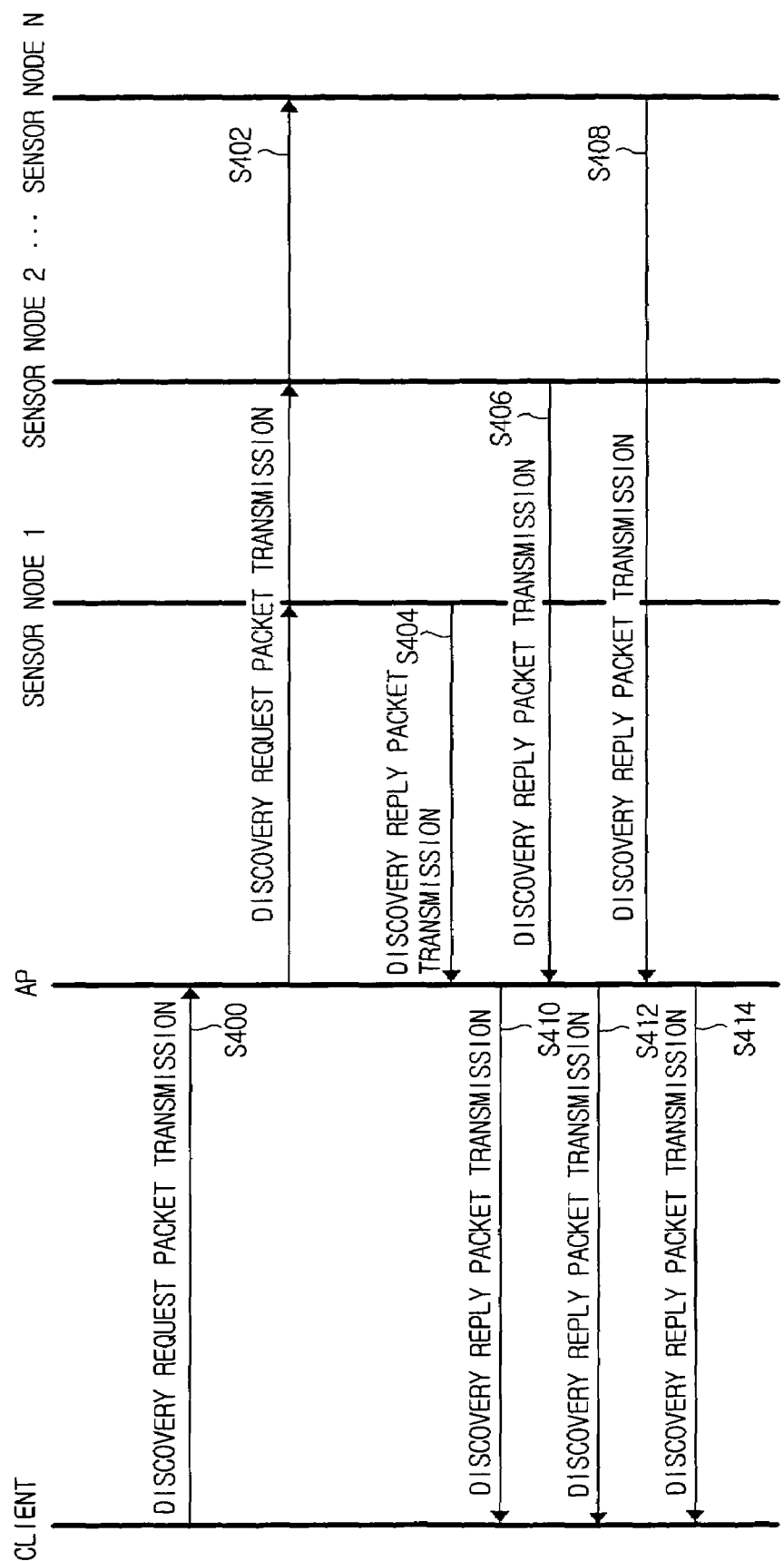
FIG. 4 illustrates transmission and reception of a discovery reply packet according to a first embodiment of the present invention.

FIG. 4 illustrates a communication network according to a first embodiment of the present invention. In FIG. 4, the communication network includes a client, an access point (AP), and a sensor node 1 through a sensor node N, similarly to FIG. 2. Hereinafter, the first embodiment of the present invention is described in reference to FIG. 4. Although FIG. 4 depicts the AP, the AP can be any device capable of relaying packets between the sensor nodes and the client.

The client transmits a discovery request packet to the AP (S400). Information contained in the discovery request packet has been set forth in reference to FIG. 2. The AP forwards the received discovery request packet to neighbor sensor nodes (S402). Referring back to FIG. 2, the AP forwards the discovery request packet to the sensor node 1 through the sensor node N. As such, the AP can multicast one discovery request packet to the sensor node 1 through the sensor node N. The AP may duplicate the received discovery request packet and forward the duplicate packet to one of the sensor node 1 through the sensor node N. If the AP consecutively transmits the duplicate discovery request packets, the AP controls to transmit the packets within a short time period.

Upon receiving the discovery request packet from the AP, the sensor node 1 through the sensor node N discover context information requested by the user. The sensor node 1 through the sensor node N generate a discovery reply packet using the discovered context information. The sensor node 1 through the sensor node N, which receive the discovery request packet substantially at the same time, generate the discovery reply packet substantially at the same time.

According to the first embodiment of the present invention, the sensor node 1 through the sensor node N transmit the generated discovery reply packet at a time randomly determined. Comparing with the related art, the discovery reply packet is generated and transmitted not at the same time but the sensor node 1 through the sensor node N transmit the discovery reply packet at a time randomly determined. The random determination of the time will be explained in detail.

Still referring to FIG. 4, the sensor node 1 transmits the generated discovery reply packet to the AP (S404). The sensor node 2 transmits the generated discovery reply packet to the AP (S406). The sensor node N transmits the generated discovery reply packet to the AP (S408). It can be seen that the sensor node 1 through the sensor node N have the different transmission time from each other. Since the transmission time is randomly selected, the sensor node 1 through the sensor node N may have the same transmission time.

The AP, upon receiving the discovery reply packet from the sensor node 1, forwards the received discovery reply packet to the client (S410). The AP receiving the discovery reply packet from the sensor node 2, forwards the received discovery reply packet to the client (S412). The AP receiving the discovery reply packet from the sensor node 3, forwards the received discovery reply packet to the client (S414).

The sensor nodes 1 through N first determine a transmission period and then determine a transmission time randomly within the determined transmission period. The following is an explanation of how to calculate a maximum transmission time for the determination of the transmission period. The longer the transmission period, the lower the packet drop ratio. However, the time when the client receives the context information is extended. Conversely, the shorter transmission period advances the time when the client receives the context information but increases the packet drop ratio. If the transmission period is close to zero, the transmission of the packet reply packet becomes similar to the related art. The maximum transmission time can be calculated from Inequalities:

$$(N_{RE} * T_{DC})/N_{FR} > RWT_{MAX} \quad (1)$$

$$1-(1-P_{DC})^{N_{RE}} > \alpha \quad (2)$$

$$(1-P_{DC})^{N_{RE}} < 1-\alpha \quad (3)$$

$$N_{RE}\log_{10}(1-P_{DC}) < \log_{10}(1-\alpha) \quad (4)$$

$$N_{RE} > \log_{10}\frac{1-\alpha}{1-P_{DC}} \quad (5)$$

-continued $$\left(\left|\log_{10}\frac{1-\alpha}{1-P_{DC}}+1\right|*T_{DC}\right)\Big/N_{FR} > RWT_{MAX} \quad (6)$$

$N_{RE}$ is the number of times of the retransmission of the discovery request packet by the client to obtain the context information, and $T_{DC}$ is a difference between the transmission time of the conventional discovery request packet and the reception time of the discovery reply packet. $N_{FR}$ is the number of fragmented discovery reply packets, which will be explained according to a second embodiment and a third embodiment of the present invention. $RWT_{MAX}$ is a maximum transmission time of the discovery reply packet. A source node transmits the discovery reply packet within $RWT_{MAX}$. $P_{DC}$ is probability of receiving the discovery reply packet from the neighbor node in one process (transmission and reception of the discovery request packet and the discovery reply packet). Hereinafter, Inequalities are explained in detail.

In Inequality (1), the maximum transmission time takes into consideration the number of times of the retransmission of the discovery request packet and the time taken for one discovery process. The maximum transmission time is determined in consideration of $N_{FR}$, but $N_{FR}$, which is 1, is not considered in the first embodiment of the present invention. Inequality (2) through Inequality (5) determine the maximum transmission time to acquire the reception ratio of the discovery reply packet of α which is an arbitrary number between 0 and 1, by use of $N_{RE}$ of the retransmission. It should be understood that α is adjustable by the user's setting. A smaller α correlates to a shorter transmission period, and a larger α correlates to a longer transmission period.

The source node repeatedly determines the transmission time at every request of the retransmission and transmits the discovery reply packet at the determined transmission time. Alternatively, the source node may transmit the discovery reply packet at a previously determined transmission time as for the request of the retransmission. In this case, the source node needs not to re-determine the transmission time.

If the client is aware of information relating to its neighbor source nodes, the client can recognize the source address through the reception of the discovery reply packet. Accordingly, the client may request to retransmit the discovery reply packet to only source nodes the discovery reply packet is not received from. Next, the AP unicasts the discovery request packet to the source node that does not transmit the discovery reply packet.

According to the first embodiment of the present invention, the transmission time of the discovery reply packet can be adjusted to balance the load on the AP. The load balance of the AP can reduce the number of the discovery reply packets lost at the AP.

Second Exemplary Embodiment

In the first embodiment of the present invention, the source node transmits one discovery reply packet without packet fragmentation. According to the second embodiment of the present invention, the source node fragments the discovery reply packet into at least two for the transmission. The number of the fragmented packets is defined as $N_{FR}$ in Inequality (1). It is to be understood that the number of the fragmented discovery reply packets is variable depending on the user's setting. As shown in FIG. 3, the discovery reply packet includes the header field and the plurality of the context information fields. According to the second embodiment of the present invention, the header field contains information relating to the number of the fragmented discovery reply packets. The source node appends partial information contained in the header field to the beginning of the fragmented discovery reply packets. Therefore, the client can receive the fragmented discovery reply packets and incorporate them into one discovery reply packet.

Figure 5:
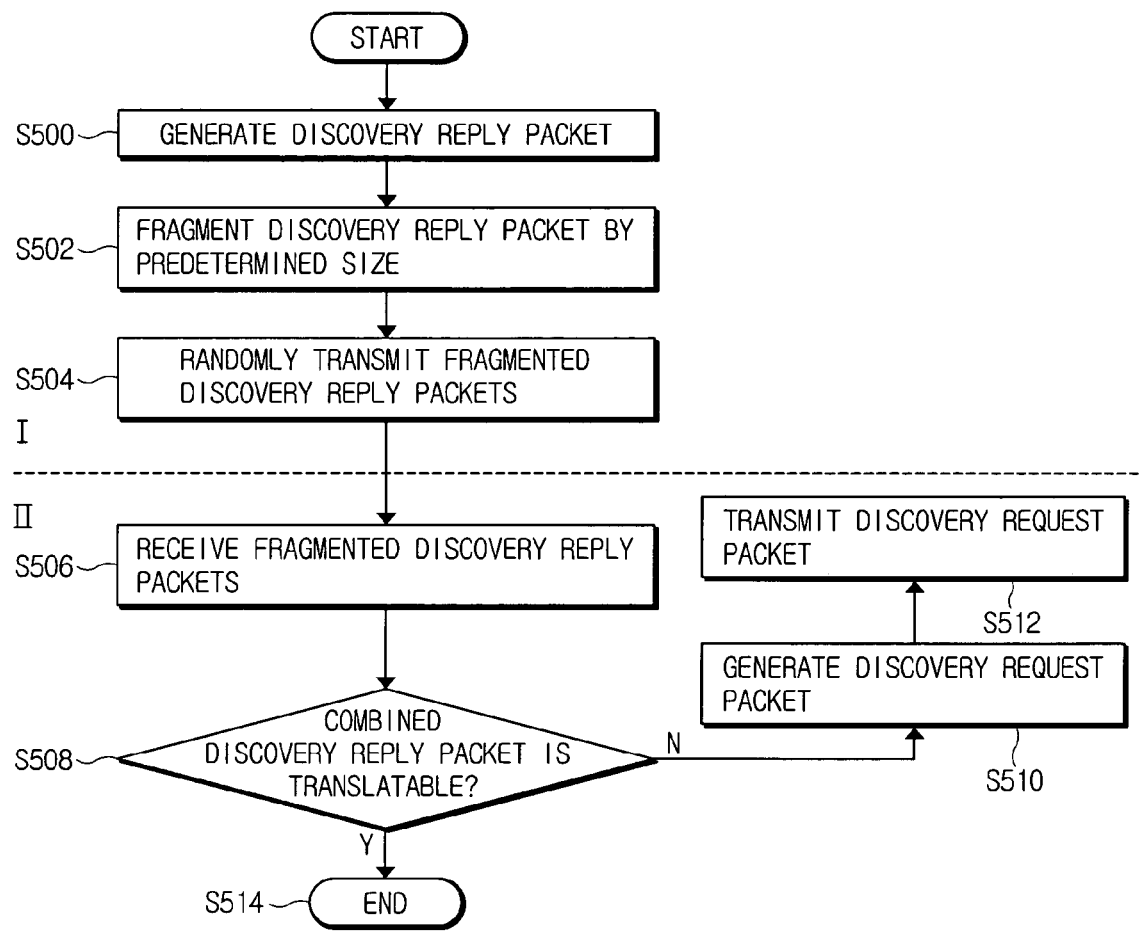
FIG. 5 is a flowchart explaining the transmission and the reception of the discovery reply packet according to a second embodiment of the present invention.

The second embodiment of the present invention is illustrated in reference to FIG. 5. In FIG. 5, operations up to I are performed by the source node and operations from II are performed by the client.

The source node receives the discovery request packet from the AP. The source node receiving the discovery request packet collects the context information and generates the discovery reply packet using the collected information (S500). As mentioned above, when at least two context information are requested from the client, the source node collects the requested context information and generates a single discovery reply packet.

The source node fragments the discovery reply packet by a predetermined size (S502). The fragment size is variable according to the user's setting as set forth above. The smaller the fragment size, the greater the number of the discovery reply packets (the fragmented discovery reply packets) transmitted from the source node. The larger the fragment size, the fewer the number of the discovery reply packets (the fragmented discovery reply packets) transmitted from the source node.

The source node consecutively transmits the fragmented discovery reply packets one by one at the transmission times randomly determined (S504). In further detail, the source node determines the same number of the transmission times as the number of the fragmented discovery reply packets and transmits the fragmented discovery reply packets one by one at the determined transmission times. The following is an explanation of the operations at the client.

The client receives the fragmented packets from the AP (S506). The client determines whether the received packets are translatable (S508). In other words, the client determines whether the required information can be acquired by combining the received packets from the AP. When the translation is possible, the client proceeds to operation S514 and ends its operations, or when the translation is impossible, the client proceeds to operation S510.

The client generates the discovery request packet (S510). The client transmits the generated discovery request packet to the AP (S512).

In FIG. 5, the client determines whether to retransmit the discovery request packet depending on the translatability of the received discovery reply packets. Hence, the AP, upon receiving the discovery request packet, unicasts the received discovery request packet to a relevant source node. Alternatively, the client may calculate the number of the translatable discovery reply packets among the received discovery reply packets, compare the calculated number with a preset value, and determine whether to retransmit the discovery request packet. The discovery request packet is retransmitted only when the calculated number is below the preset value. In this situation, the AP multicasts the discovery request packet.

Third Exemplary Embodiment

According to the third embodiment of the present invention, the discovery reply packet is fragmented and transmitted, similarly to the second embodiment of the present invention. A difference lies in that the discovery reply packet is fragmented by a significant unit. In particular, the discovery reply packet of FIG. 3 includes the plurality of context information fields. In the third embodiment of the present invention, the discovery reply packet is fragmented by unit of the context information field. When fragmenting the discovery reply packet, the client divides the packet into a requisite part for the context information translation and an additional part. It should be appreciated that the additional part contains information additionally required for the translation of the context information.

Hereinafter, the third embodiment of the present invention is described in reference to FIG. 6.

The source node generates the discovery reply packet (S600). The source node fragments the generated discovery reply packet by a significant unit (S602). The explanation as to the significant unit has been provided above. The source node transmits to the AP the fragmented packets at the transmission times randomly determined (S604). The client receives the fragmented packets from the AP (S606). Since the discovery reply packet is fragmented by the significant unit in the third embodiment of the present invention, the client can translate the received packets.

Figure 6:
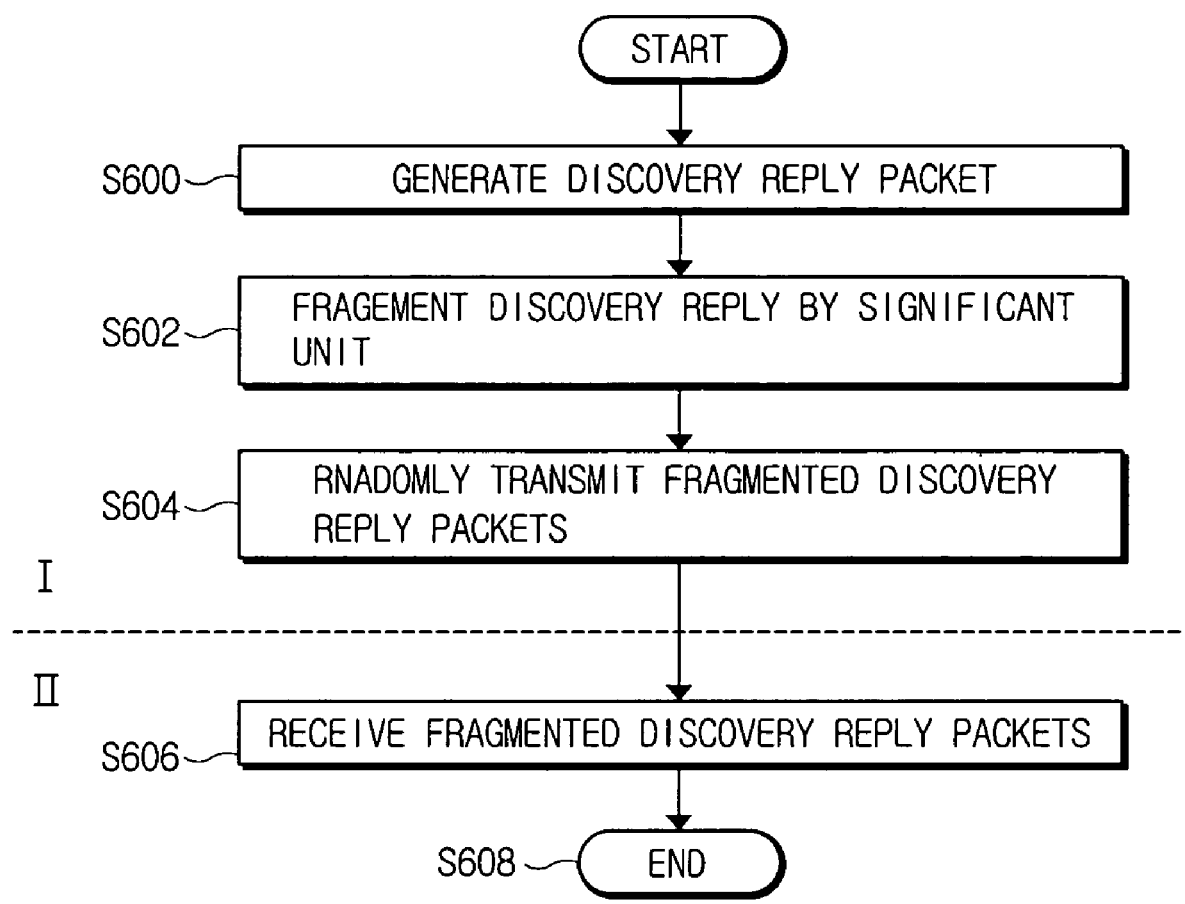
FIG. 6 is a flowchart explaining the transmission and the reception of the discovery reply packet according to a third embodiment of the present invention.

Although FIG. 6 illustrates the fragmentation based on the significant unit of the context information field by way of example, the significant unit may be at least two context information fields. The number of the fragmented packets can be reduced as the source node transmits the at least two fragmented context information fields.

Although not illustrated in FIG. 6, according to the third embodiment of the present invention, the client receiving the packets fragmented by the unit of the context information can determine whether the combined packets are translatable, and unicast the retransmission request of the context information to the AP when it is infeasible to translate the combined packets according to the determination.

The sensor node provides the context information to the AP according to one of the first through third embodiments of the present invention. The sensor node selects one of the first through third embodiments of the present invention in relation with the number of intermediate nodes to the AP. The number of the intermediate nodes that deliver the context information to the AP can be classified into at least three ranges. The higher the number of the intermediate nodes delivering the context information to the AP, the higher the number of the context information lost at the AP. The following is an explanation of the at least three ranges classified based on the number of the intermediate nodes.

With respect to the number of the intermediate nodes, the first range is below 'a', the second range is between 'a' and 'b' (b>a), and the third range is above 'b'.

Specifically, when the number of the intermediate nodes delivering the context information lies in the first range, the sensor node transmits the context information according to the first embodiment of the present invention. When the number of the intermediate nodes lies in the second range, the source node transmits the context information according to the second embodiment of the present invention. When the number of the intermediate nodes lies in the third range, the source node transmits the context information according to the third embodiment of the present invention. Information relating to the number of the intermediate nodes can be obtained from the client or through the information exchange between the intermediate nodes at time intervals.

Also, the source node may select one of the first and third embodiments of the present invention based on a status of a radio channel. When the radio channel is in the normal status, the source node transmits the context information according to the first embodiment of the present invention. When the radio channel is in the abnormal status, the source node transmits the context information according to the second embodiment of the present invention. As for the worse status of the radio channel, the source transmits the context information according to the third embodiment of the present invention.

The source node may transmit the context information according to the third embodiment of the present invention when reliability of the transmitted context information is required. Furthermore, the source node may conduct the initial transmission according to the first embodiment of the present invention, and transmit the context information according to the second or third embodiment of the present invention as for the request of the retransmission. As such, the source node may select one of the first through third embodiments of the present invention in consideration of other various conditions.

In light of the foregoing as set forth above, the load on the AP can be reduced as the sensor nodes send the discovery reply packet at the random transmission times. Although the AP has a queue with a predetermined storage capacity, if the received discovery reply packets exceed the storage capacity, some of the received discovery reply packets are subject to loss. According to the embodiments of the present invention, the respective sensor nodes randomly determine their transmission times and transmit the discovery reply packet at the determined transmission times. Therefore, the load on the AP can be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for determining a transmission time of collected context information at a sensor node in a communication system that includes a client, at least one sensor node collecting context information, and an access point (AP) forwarding the context information received from the sensor node to the client, the communication system operating in a session layer of protocol layers of open systems interconnection (OSI), the method comprising:
    determining, using a processor, a maximum transmission time,
        wherein the maximum transmission time is based on a number of retransmissions by the client of a request for the context information;
    calculating a transmission period in which the collected context information is transmitted,
        wherein the maximum transmission time is an upper bound of the transmission period; and
    randomly determining a transmission time at which the context information is transmitted within the calculated transmission period.

2. The method according to claim 1, wherein the transmission period is determined based on a drop ratio of the context information.

3. The method according to claim 1, wherein the client calculates a number of sensor nodes that transmit the context information, and requests to retransmit the context information when the calculated number of the sensor nodes is below a preset value.

4. The method according to claim 3, wherein the sensor node retransmits the collected context information at a previously determined transmission time when the retransmission of the context information is requested.

5. The method according to claim 1, wherein at least two context information collected are transmitted to the AP as one packet.

6. The method according to claim 1, wherein the transmission period is determined based on a longest transmission time.

7. The method according to claim 1, wherein for transmission of context information, a new transmission time is randomly determined.

8. The method according to claim 1, wherein the maximum transmission time is determined based on a number of retransmissions of a request for the collected context information, received at the sensor node.

9. The method according to claim 1, wherein the maximum transmission time is determined based on a user adjustable variable,
    wherein a value of the variable is correlated to a length of the transmission period.

10. A method for determining a transmission time of collected context information at a sensor node in a communication system that includes a client, at least one sensor node collecting context information, and an access point (AP) forwarding the context information received from the sensor node to the client, the communication system operating in a session layer of protocol layers of open systems interconnection (OSI), the method comprising:
    determining, using a processor, a maximum transmission time,
        wherein the maximum transmission time is based on a number of retransmissions by the client of a request for the context information;
    calculating a transmission period in which the collected context information is transmitted,
        wherein the maximum transmission time is an upper bound of the transmission period;
    fragmenting a packet of the collected context information by a specific size; and
    randomly determining transmission times at which the fragmented context information are transmitted within the calculated transmission period.

11. The method according to claim 10, further comprising:
    consecutively transmitting the fragmented packets at the transmission times randomly determined.

12. The method according to claim 11, further comprising:
    combining, at the client receiving the fragmented packets, the fragmented packets and determining whether the combined packet is translatable.

13. The method according to claim 12, wherein the client unicasts a request of the retransmission of the context information to the AP when it is infeasible to translate the combined packet.

14. A method for determining a transmission time of collected context information at a sensor node in a communication system that includes a client, at least one sensor node collecting context information, and an access point (AP) forwarding the context information received from the sensor node to the client, the communication system operating in a session layer of protocol layers of open systems interconnection (OSI), the method comprising:
    determining, using a processor, a maximum transmission time,
        wherein the maximum transmission time is based on a number of retransmissions by the client of a request for the context information;
    calculating a transmission period in which the collected context information is transmitted, wherein the maximum transmission time is an upper bound of the transmission period;

fragmenting a packet of the collected context information by unit of at least one context information; and randomly determining transmission times at which the fragmented context information are transmitted within the calculated transmission period.

15. The method according to claim 14, further comprising:

determining, at the client receiving the packets fragmented by unit of the context information, whether a combined fragment packet is translatable.

16. The method according to claim 15, wherein the client unicasts a request of the retransmission of the context information to the AP when it is infeasible to translate the combined packet.

17. The method according to claim 14, wherein the client fragments the packet into a requisite part for the translation of the context information and an additional part.

18. The method according to claim 17, wherein the fragmented additional part contains additional information for the translation of the context information.

19. A method for determining a transmission time of collected context information at a sensor node in a communication system that includes a client, at least one sensor node collecting context information, and an access point (AP) forwarding the context information received from the sensor node to the client, the communication system operating in a session layer of protocol layers of open systems interconnection (OSI), the method comprising:

selecting a transmission type of context information based on at least one of a number of sensor nodes and a status of a radio channel;

determining, using a processor, a maximum transmission time, wherein the maximum transmission time is based on a number of retransmissions by the client of a request for the context information;

calculating a transmission period in which the collected context information is transmitted, wherein the maximum transmission time is an upper bound of the transmission period;

randomly determining a transmission time at which the context information is transmitted within the calculated transmission period; and transmitting the context information at the determined transmission time according to the selected transmission type.

20. The method according to claim 19, wherein the transmission type includes a type for transmitting a packet containing at least one context information, a type for fragmenting the packet containing the at least one context information by a specific size and transmitting the fragmented packets, and a type for fragmenting the packet containing the at least one context information by context information.

* * * * *